United States Patent
Ide et al.

(10) Patent No.: US 6,282,379 B1
(45) Date of Patent: *Aug. 28, 2001

(54) AUTOFOCUS APPARATUS OF A CAMERA

(75) Inventors: Masataka Ide, Hachioji; Takeshi Ishino, Iruma, both of (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/709,086

(22) Filed: Sep. 6, 1996

(30) Foreign Application Priority Data

Sep. 8, 1995 (JP) .................................... 7-231403

(51) Int. Cl.[7] .......................... G03B 13/18; G03B 13/36; G03B 3/10

(52) U.S. Cl. .............................................. 396/89; 396/134

(58) Field of Search ................................ 396/134, 89, 135, 396/136, 133; 310/316

(56) References Cited

U.S. PATENT DOCUMENTS

| Re. 33,016 | * | 8/1989 | Ishikawa et al. | 354/400 |
|---|---|---|---|---|
| 4,477,167 | * | 10/1984 | Ishikawa et al. | 354/400 |
| 4,537,487 | * | 8/1985 | Taniguchi et al. | 396/134 |
| 4,922,279 | * | 5/1990 | Hamada et al. | 396/134 |
| 5,008,605 | * | 4/1991 | Ohara et al. | 396/134 |
| 5,077,571 | * | 12/1991 | Takayama et al. | 396/134 |
| 5,463,442 | * | 10/1995 | Harigaya et al. | 396/134 |
| 5,493,163 | * | 2/1996 | Nishikawa | 310/316 |
| 5,543,971 | * | 8/1996 | Nomura et al. | 396/134 |

FOREIGN PATENT DOCUMENTS 60-52812   3/1985   (JP) .
4-306608   10/1992   (JP) .

* cited by examiner

Primary Examiner—Russell Adams
Assistant Examiner—Christopher E. Mahoney
(74) Attorney, Agent, or Firm—Kenyon & Kenyon

(57) ABSTRACT

An autofocus apparatus of a camera includes a lens, a range-finding device for detecting a direction and an amount of defocus, a driving circuit for driving the lens, a memory for storing the latest driving direction of the lens, and a control circuit for canceling a backlash of the lens when the driving direction of the lens is altered.

40 Claims, 8 Drawing Sheets

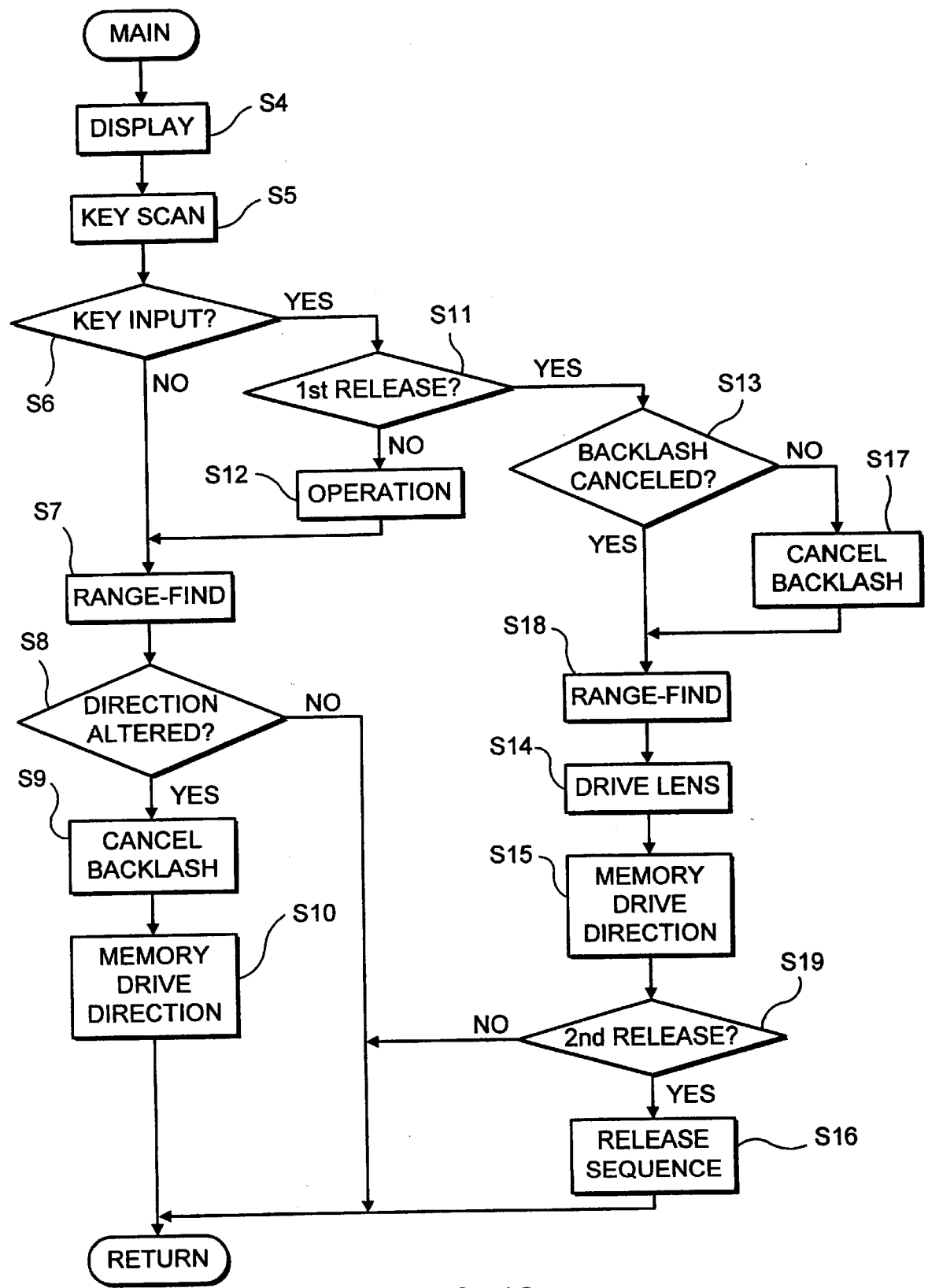
F I G. 10

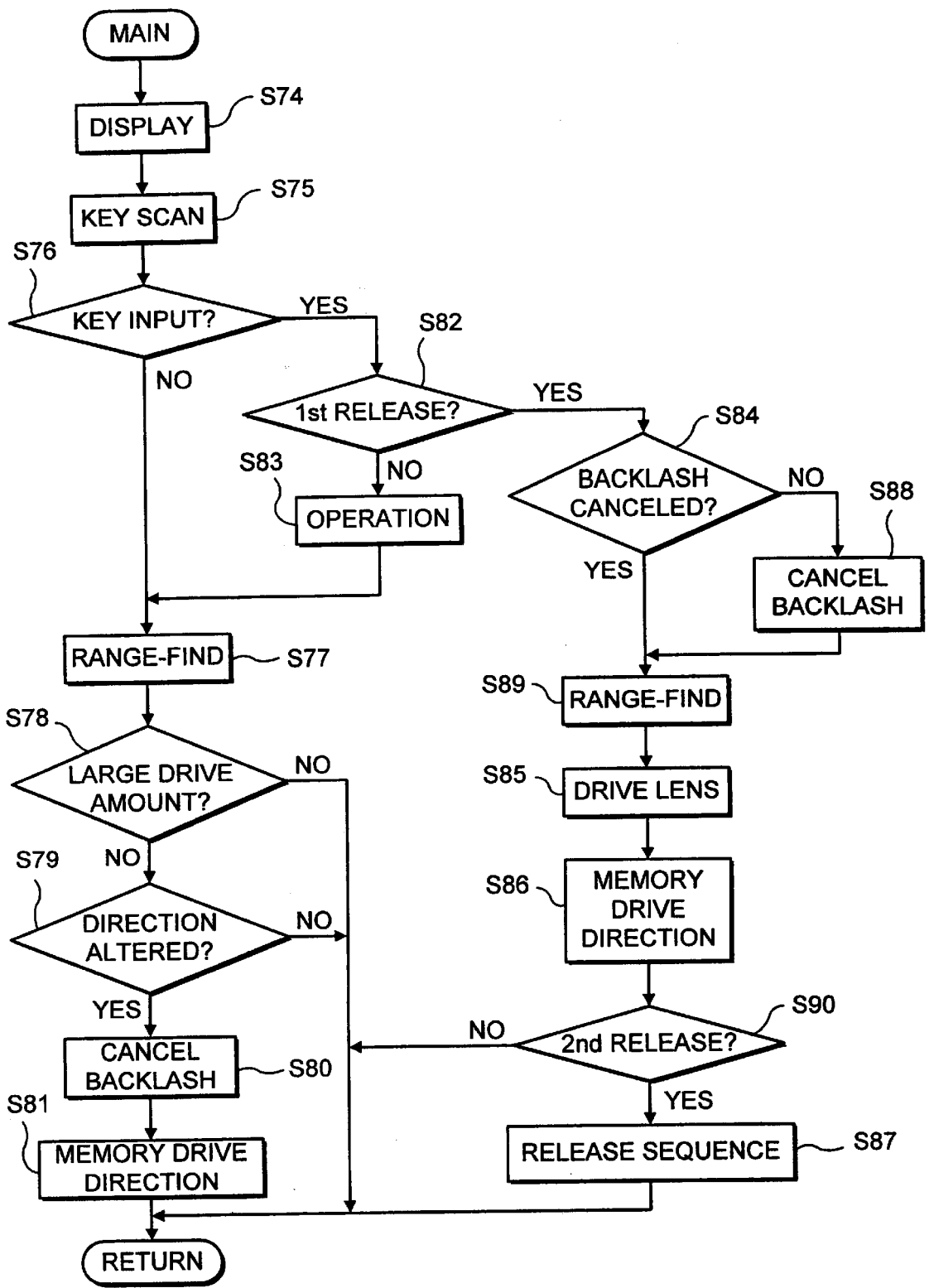
F I G. 13

AUTOFOCUS APPARATUS OF A CAMERA

BACKGROUND OF THE INVENTION

1. Field of the Invention

The present invention relates generally to an autofocus apparatus of a camera, and more particularly to an autofocus apparatus of a camera, which detects a direction and an amount of defocus of a photo-taking lens of the camera, and drives the lens on the basis of the direction and the amount of detected defocus.

2. Description of the Related Art

The range-finding principle of a TTL (through the taking lens) phase difference detection will be described below with reference to FIGS. 3–5. A pair of separator lenses 102, which are provided symmetrically with an optical axis 101 at spacing S with each other, are located at a distance $f_o$ rearward from an equivalent surface of a film surface 100. A focus sensor 103, which includes a pair of photoelectric sensor arrays, is located at a distance $f_j$ rearward from the separator lenses 102. The reference numeral 104 represents a taking lens of a camera.

When compared with various focusing conditions, such as an in-focus condition (FIG. 3), a front focus condition (FIG. 4), and a rear focus condition (FIG. 5), the spacing of images 105 on the focus sensor 103 can be respectively characterized as front focus, in-focus, and rear focus, so that defocus amount is determined by measuring the spacing of images 105.

FIG. 6 illustrates the focus detecting principle in detail. The focus sensor 103 has a pair of sensors, unit a and unit b, each unit including m sensors of pitch p.

The output signals obtained from unit a and unit b from the output signal that is nearest to the optical axis 101 to the output signal that is farthest from optical axis 101 are defined as follows;

$$V_{a1}, V_{a2}, V_{a3}, \ldots V_{an}, \ldots V_{am}$$

$$V_{b1}, V_{b2}, V_{b3}, \ldots V_{bn}, \ldots V_{bm}$$

where m>n.

Now, a shift operation is carried out by using n sensor signals out of m sensor signals of unit a and unit b, which is given by the following equation:

$$\Delta V_j = \Sigma |V_{ai+j} - V_{bi+j}| \quad (1)$$

where j=1−n.

FIG. 7 illustrates the result of the shift operation given above. When the minimum value of $\Delta V_j$ is defined as $\Delta V_{jo}$, the following equation is obtained by applying similarity of triangles as follows:

$$S/2/f_x = Pj_o/f_j$$

$$f_x = Sf_j/(2Pj_o) \quad (2)$$

Defocus amount $\Delta f_c$, which is defined as the difference between a film plane and a focus plane of a taking lens, is given below:

$$\Delta f_c = f_o - f_x$$

$$= f_o - Sf_j/(2Pj_o) \quad (3)$$

The required drive amount of the lens for making them in-focus is given as follows:

$$K = \Delta fc\beta^2(f_{TL})$$

$$= \beta^2(f_{TL})\{f_o - Sf_j/(2Pj_o)\} \quad (4)$$

where the longitudinal magnification of the taking lens to the film surface is defined as $\beta^2$ ($f_{TL}$).

Moreover, the brightness of the object is given by measuring the amplitude of the output signals from the focus sensors.

FIG. 8(a) illustrates a lens drive apparatus in detail. The CPU 6 outputs to the IFIC (interface IC) 17 a signal indicative of the driving direction of the lens. The IFIC 17 then causes the motor 18 to apply a driving voltage. Thus, as the motor 18 begins to rotate, a screw 23 rotates via a shaft 26, so that the taking lens group 5, which is fixed to a lens barrel 22, moves along the optical axis 101 of the taking lens.

FIG. 8(b) illustrates a PI (photo-interrupter) 25 which is provided in the vicinity of a PI blade 24 provided on the shaft 26. The PI 25 corresponds to the pulse generator 27. Since the PI blade 24 has some periodic holes on it, the PI 25 outputs pulse signals in response to rotation of the PI blade 24. When the motor 18 rotates, the PI 25 outputs pulse signals. The CPU 6 counts the number of pulse signals from PI 25, so that the movement of the taking lens is determined. A predetermined number of pulse signals are counted in order to cancel backlash of the taking lens.

Japanese unexamined Patent Publication hei 4-306608 discloses a focus detecting apparatus which drives a photo-taking lens according to defocus measurements. The apparatus drives the lens according to a re-detection of a defocus occurring after correcting the backlash of the lens when the driving direction of the lens is altered.

Japanese unexamined Patent Publication sho 60-52812 discloses a focus detecting apparatus which drives a photo-taking lens according to defocus measurements. The apparatus drives the lens with adding backlash amount of the lens when the driving direction of the lens is altered.

In the focus detecting apparatus according to hei 4-306608, however, the driving direction of the lens is determined after a release button of the camera is actuated. If the driving direction of the lens is altered, then, at first, the lens is driven by as much as the backlash amount. Following this lens drive operation, a re-detection of the defocus amount and a driving of the lens are performed. Accordingly, the time lag between operation timing of the release button and in-focus timing tends to be relatively long.

In the focus detecting apparatus according to sho 60-52812, however, the backlash amount of the lens is added to the driving amount of the lens if the driving direction of the lens is altered. Accordingly, the accuracy in focusing tends to be reduced, and redetection of the defocus amount for assuring focus state of the lens is further required.

SUMMARY OF THE INVENTION

The first object of the present invention is to provide a focus detecting apparatus of a camera which has less focus time lag without reducing an accuracy in focusing.

These and other advantages and features of the present invention will become readily apparent to those skilled in the art after reading the following detailed description of the invention and studying the accompanying drawings.

BRIEF DESCRIPTION OF THE DRAWINGS

The present invention will be more apparent from the following detailed description, when taken in conjunction with the accompanying drawings, in which;

FIG. 10 illustrates a flowchart corresponding to the operation of a first embodiment of the present invention;

FIG. 13 illustrates a flowchart corresponding to the operation of a fourth embodiment of the present invention.

DESCRIPTION OF THE PREFERRED EMBODIMENTS

Preferred embodiments of the present invention will be explained below with reference to the accompanying drawings.

Figure 1:
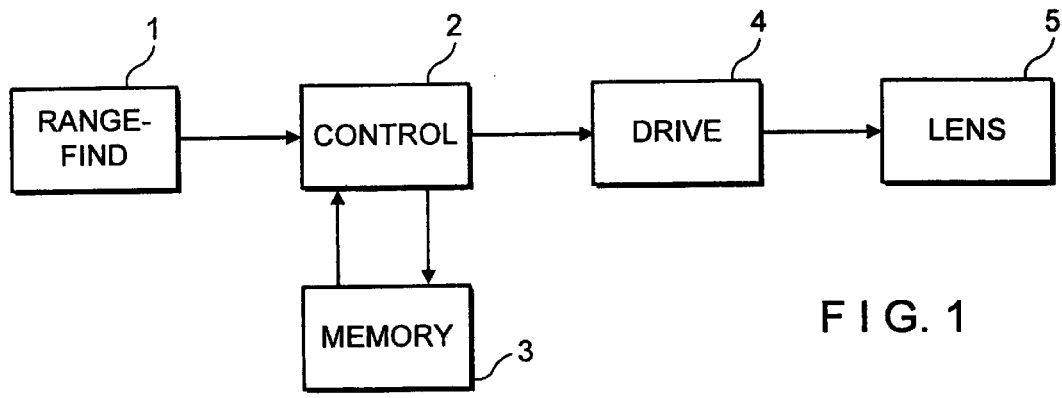
FIG. 1 illustrates a block diagram of a focus detecting apparatus according to the present invention.

FIG. 1 illustrates a block diagram of a focus detecting apparatus according to the present invention. In FIG. 1, a range-finding means 1 measures a distance to an object from the focus detecting apparatus, and the distance measurements are sent to a control means 2. Memory means 3 memorizes a driving direction of a taking lens group 5. The control means 2 determines a driving direction and a driving amount of the taking lens group 5, and the control means 2 controls drive means 4 for driving the taking lens group 5.

Figure 2:
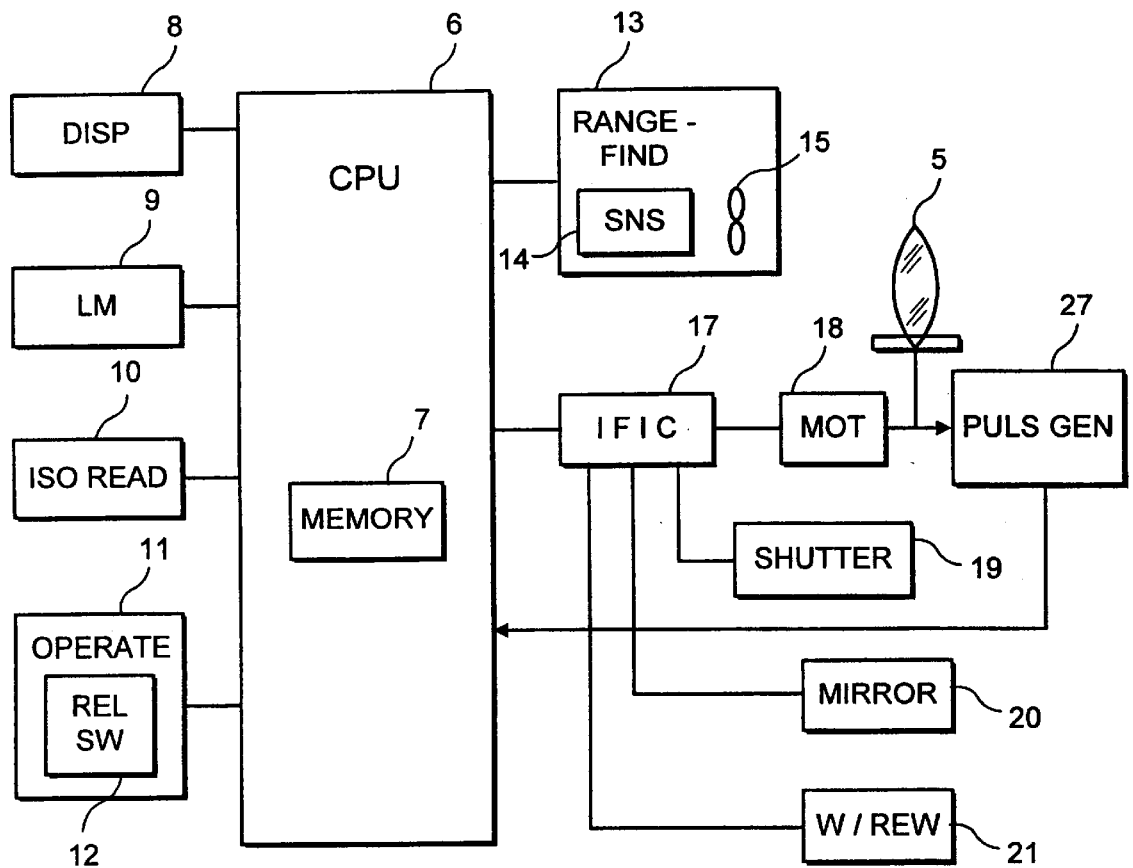
FIG. 2 illustrates a detailed block diagram of a focus detecting apparatus of a camera.
Figure 3:
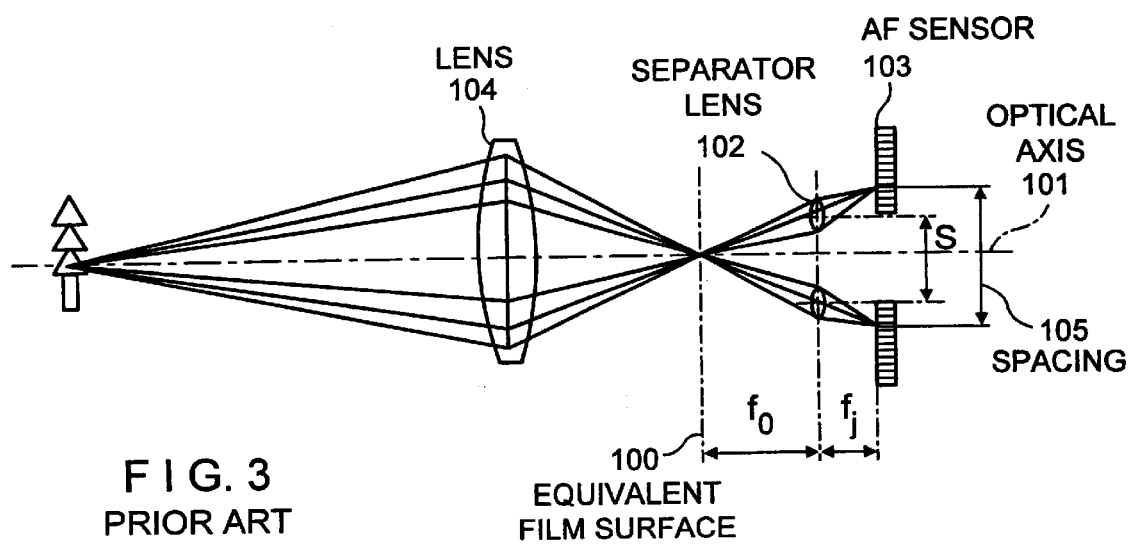
FIG. 3 illustrates a prior art focus detecting principle showing an in-focus condition.
Figure 4:
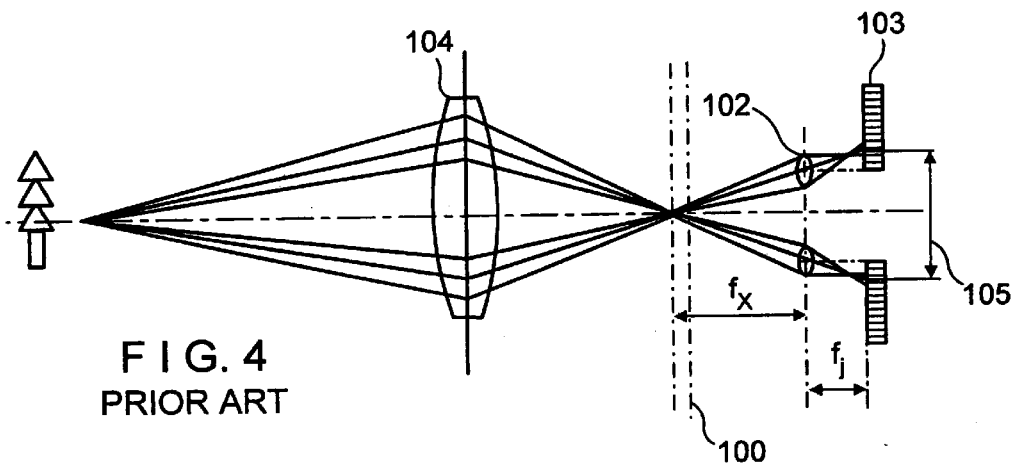
FIG. 4 illustrates a prior art focus detecting principle showing a front focus condition.
Figure 5:
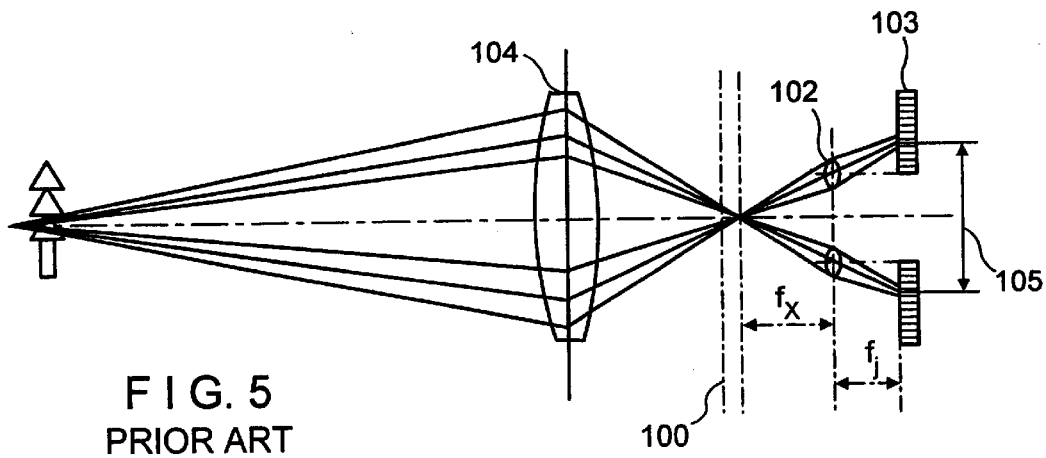
FIG. 5 illustrates a prior art focus detecting principle showing a rear focus condition.
Figure 6:
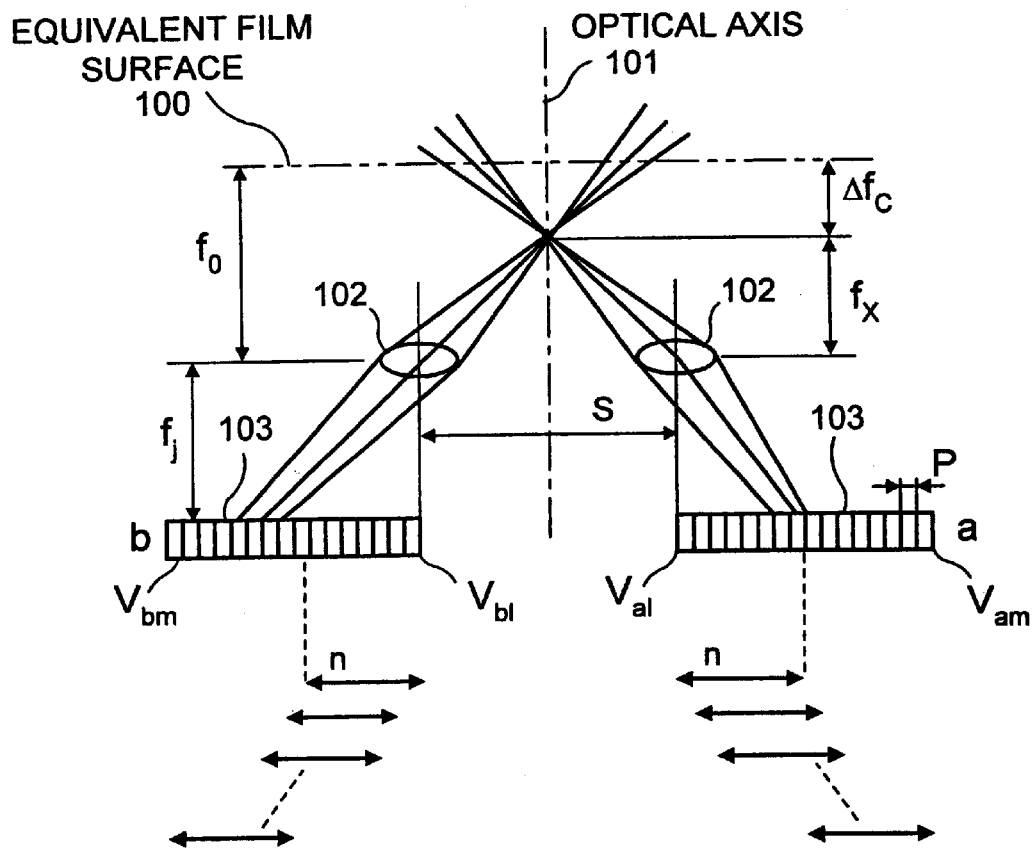
FIG. 6 illustrates a prior art focus detecting principle.
Figure 7:
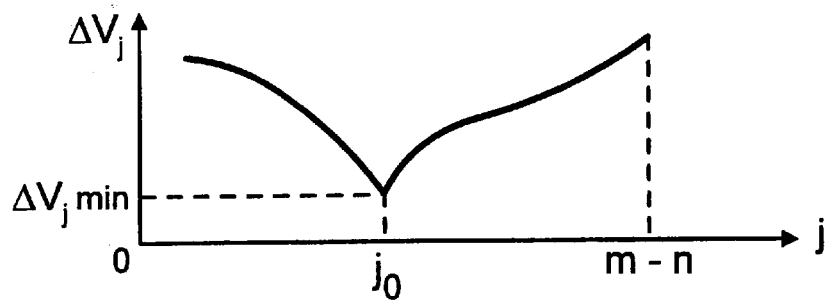
FIG. 7 illustrates the result of a prior art shift operation.
Figure 8A:
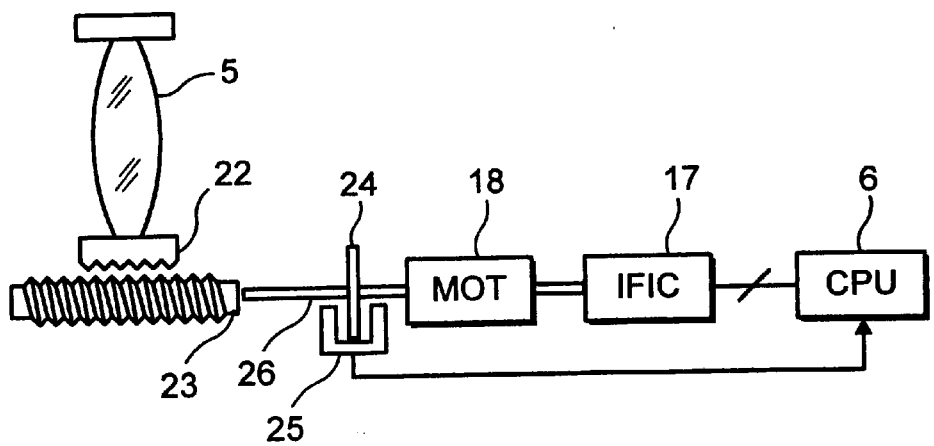
FIG. 8 illustrates a prior art lens driving apparatus.
Figure 8B:
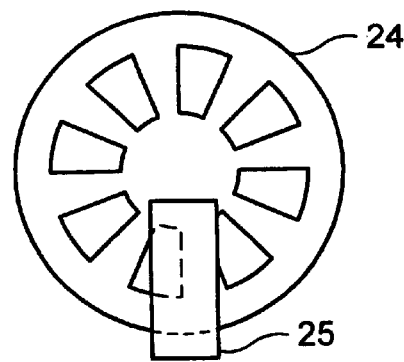

FIG. 2 is a block diagram of the focus detecting apparatus shown in FIG. 1. In FIG. 2, a display section 8, a light-metering section 9, an ISO read-in section 10, an operating section 11 including a release switch 12, a range-finding section 13 including a focus sensor 14 and a separator lens 15, and an IFIC (interface IC) 17 are respectively connected to a CPU 6 having a memory 7. The taking lens group 5 and a driving pulse generator 27 are connected to the IFIC 17, which is also connected to a motor 18, a shutter 19, mirror 20, and a film wind/rewind section 21. In FIG. 2, the CPU 6 corresponds to the control means 2 in FIG. 1, and the memory 7 corresponds to the memory means 3 in FIG. 1. The range-finding block 13 including the focus sensor 14 and the separator lens 15 corresponds to the range-finding means 1 in FIG. 1, and the IFIC 17 and the motor 18 correspond to the drive means 4 in FIG. 1, respectively.

Figure 9:
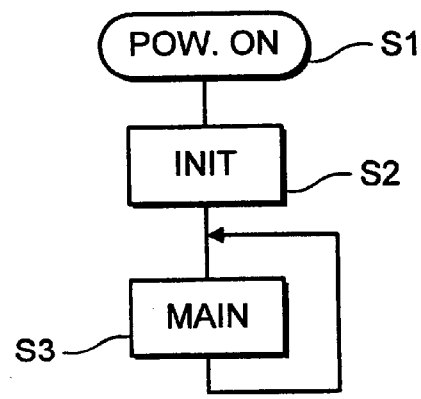
FIG. 9 illustrates a flowchart corresponding to the operation of the present invention.

FIG. 9 illustrates a flowchart showing the operation of the CPU 6. In FIG. 9, power is applied in step S1, initializing operation is effected in S2, and the flow proceeds to a main sequence S3.

FIG. 10 illustrates a flowchart corresponding to the operation of a first embodiment of the present invention. In FIG. 10, display and other process are effected in S4, and state of operation switches are sensed in S6 by the result of a key scan operation in S5. If no keys are operated, then range-finding is effected in S7, and the driving direction of the lens 5 is judged as to whether it is altered in S8. If the driving direction of the lens is determined not to be altered, then the main sequence proceeds to end. If the driving direction of the lens has been altered, the backlash of the lens is canceled in S9, the driving direction is memorized in S10, and the main sequence proceeds to end.

On the other hand, if any of the operation switches is operated, then a release switch is checked in S11. If any switches other than the release switch is operated, operation according to the operated switch is effected in S12. If the release switch is operated, then the next step S13 determines whether the backlash of the lens has been canceled. If the backlash of the lens has been canceled, then a range finding is performed in S18, the lens is driven in S14, and the driving direction of the lens is memorized in S15. After that, a sequence including mirror drive, diaphragm drive, shutter drive, and film advance is effected in S16, and the main sequence proceeds to end.

In S13, if the backlash of the lens has not canceled yet, then the backlash of the lens is canceled in S17, range-finding is effected again in S18, the lens is driven in S14, the driving direction of the lens is memorized in S15, the above identified sequence is effected in S16, and the main sequence proceeds to end.

According to the first embodiment, the backlash of the lens is canceled when operating the release switch, because the lens backlash is canceled before sensing the release switch. Therefore, the time-lag between operation timing of the release switch and in-focus timing can be shortened as much as range-finding and cancel of lens backlash without reducing accuracy in focusing.

Now, a second embodiment of the present invention will be described with reference to FIGS. 9 and 11. In FIG. 9, power is applied in step Si, initializing operation is effected in S2, and a main sequence corresponding to the second embodiment is executed in S3.

Figure 11:
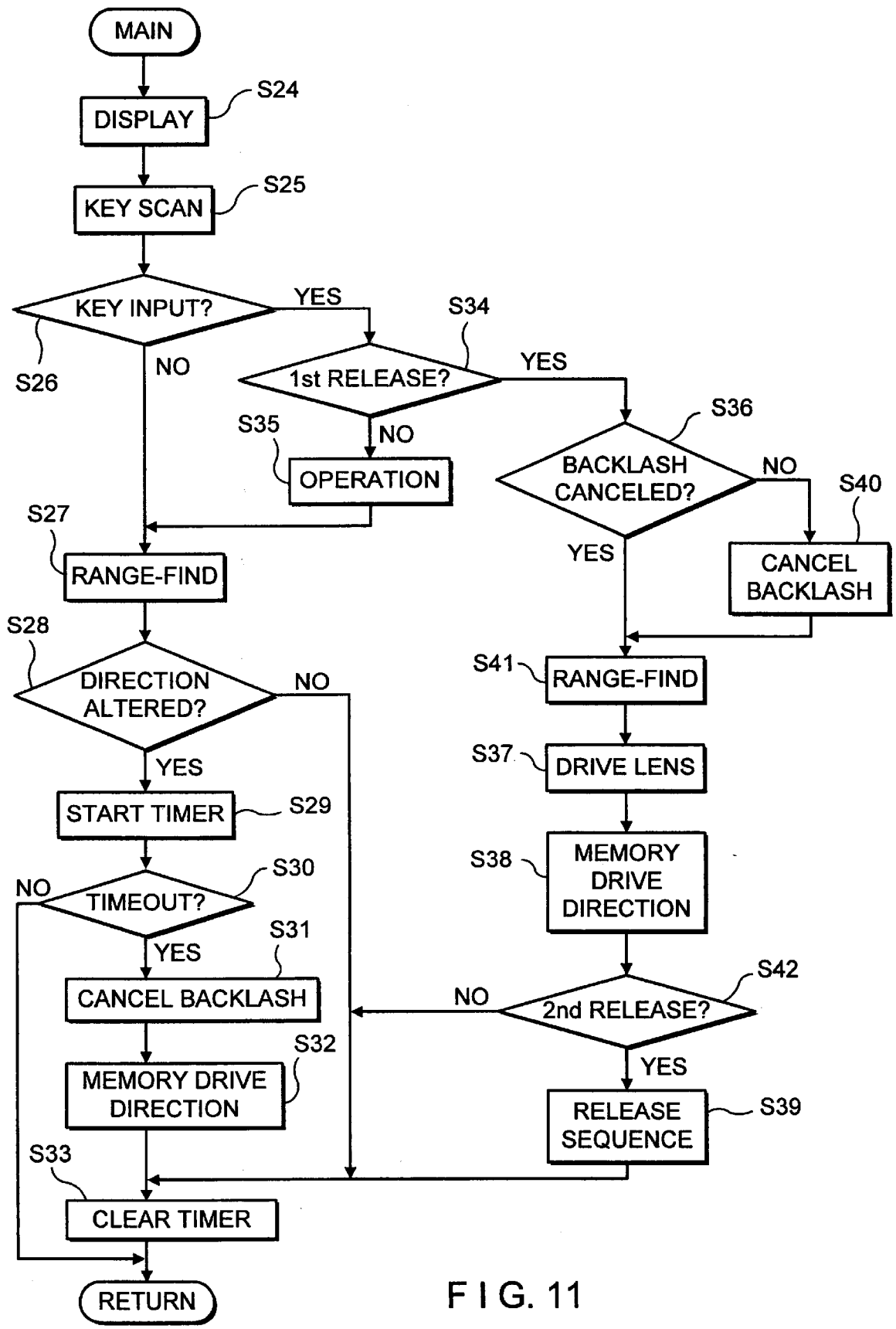
FIG. 11 illustrates a flowchart corresponding to the operation of a second embodiment of the present invention.

FIG. 11 illustrates a flowchart corresponding to the operation of a second embodiment of the present invention. In FIG. 11, display and other process are effected in S24, and state of operation switches are sensed in S26 by the result of a key scan operation in S25. If no keys are operated, then range-finding is effected in S27, and the driving direction of the lens 5 is judged as to whether it has been altered in S28. If the driving direction of the lens is determined not to be altered, then a timer is cleared in S33, and the flow proceeds to end in S3. On the other hand, when the drive direction of the lens is altered, the timer begins to count in S29, and the timer is checked if the timer reaches a predetermined value, in other words, predetermined drive judge condition in S30. While the timer does not reach the predetermined value, the main sequence proceeds to end. If the timer has reached the predetermined value, the backlash of the lens is canceled in S31, the driving direction is memorized in S32, the timer is cleared in S33, and the main sequence proceeds to end.

In S26, if any switch operation is detected, the switch is checked if it is a release switch in S34. If any switch other than the release switch is operated, then any operation according to the switch is effected in S35. When the release switch is operated, then the photo-taking lens is checked if backlash of the lens has been canceled in S36. If the backlash of the lens has been already canceled, then a range finding is performed in S41, the lens is driven to an in-focus position in S37, and the lens drive direction is memorized in S38. After that, a sequence including mirror drive, diaphragm drive, shutter drive, and film advance is effected in S39, the timer is cleared in S33, and the main sequence proceeds to end.

On the other hand, in S36, if the backlash of the lens has not been canceled, then the backlash of the lens is canceled in S40, range-finding is effected again in S41, the lens is driven in S37, the driving direction of the lens is memorized in S38, the above identified sequence is effected in S39, the timer is cleared in S33, and the main sequence proceeds to end.

The second embodiment will be summarized below.

While the camera has been directed to an object to be photographed without operating the release switch, range-finding is effected repeatedly in S27. If the drive direction of the lens is altered during the range-finding, the judgment in S28 becomes Yes, and then the timer begins to count. When the timer reaches a predetermined value, then the judgment in S30 becomes Yes, so that backlash of the lens is canceled in S31.

After that, on operating the release switch, the judgment in S36 is Yes, and the lens is driven to an in-focus position without canceling the backlash, because the backlash of the lens has been already canceled before sensing the release switch. If the release switch is operated before the counter reaches the predetermined value, the backlash of the lens has not been canceled, the judgment in S36 is No, so that canceling of the backlash in S40, and range-finding in S37 are effected.

According to the second embodiment, while the camera has been directed to an object to be photographed without operating the release switch until the counter reaches the predetermined value, the backlash of the lens is canceled, and as a result, the time-lag between operation timing of the release switch and in-focus timing can be reduced as much as defocus detection and cancel of lens backlash without reducing accuracy in focusing. Moreover, as the timer regulates backlash canceling of the lens, so that battery consumption is reduced because backlash of the lens is not canceled so frequently.

A clock or a counter can be used as the time count in S29. In case of using a clock, judgment excess of the time limit can be made by comparing the present time with the last time driving the lens. In case of using a counter, a count time interval is determined by using a clock or by using a frequency divided signal from an oscillator (not shown in FIG. 2) of the CPU 6.

Now, a third embodiment of the present invention will be described with reference to FIGS. 9 and 12. In FIG. 9, power is applied in step S1, initializing operation is effected in S2, and a main sequence corresponding to the third embodiment is executed in S3.

Figure 12:
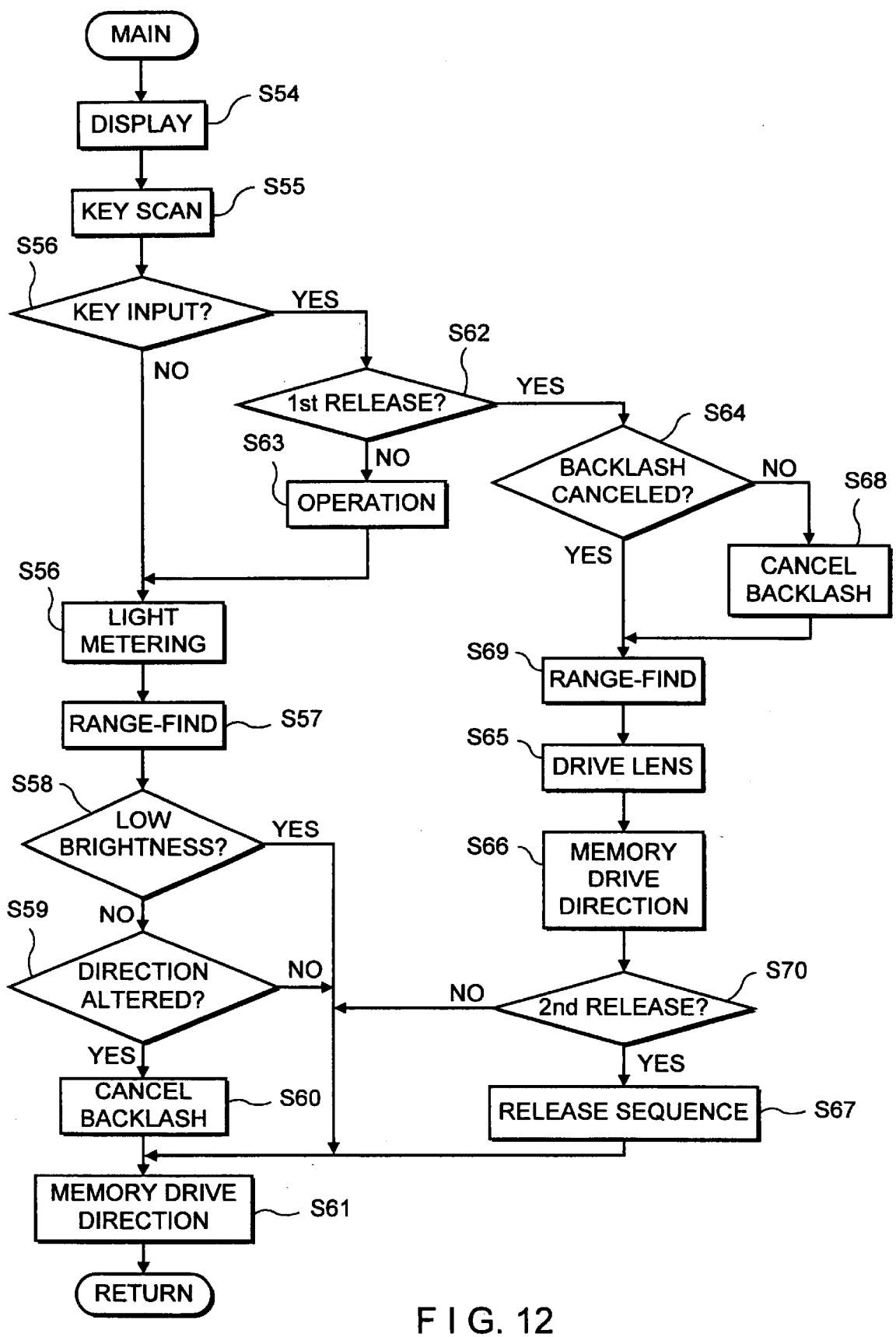
FIG. 12 illustrates a flowchart corresponding to the operation of a third embodiment of the present invention.

FIG. 12 illustrates a flowchart corresponding to the operation of the third embodiment of the present invention. In FIG. 12, display and other process are effected in S54, and a state of operation switches are sensed in S56 by the result of key scan operation in S55.

If no keys are operated, then range-finding is effected in S57, and the object brightness is judged as to whether it is greater than a predetermined value in S58. If the object brightness is lower than the predetermined value, then the main sequence proceeds to end because it seems to have lower reliability in focus detection.

On the other hand, if the object brightness is greater than the predetermined value, then drive direction of the lens is judged whether it is same as before or altered in S59. If the drive direction of the lens is the same as before, the main sequence proceeds to end because the backlash of the lens has been canceled. If the direction of the lens has been altered, canceling of the backlash is effected in S60, the drive direction of the lens is memorized, and the main sequence proceeds to end.

In S56, if any operation switch is judged to be operated, the operated switch is checked whether it is the release switch in S62. If it is other than the release switch, then the flow proceeds to its function in S63; otherwise, the lens is checked whether the backlash has been canceled in S64. If the backlash of the lens has been canceled, a range finding is performed in S69, the lens is driven to an in-focus position in S65, and the drive direction of the lens is memorized in S66. After that, the sequence including light-metering, mirror drive, diaphragm drive, shutter drive, and film advance is effected in S67, and the main sequence proceeds to end.

In S64, if the backlash of the lens has not been canceled, canceling of the backlash in S68, re-range-finding in S69, lens drive in S65, and the exposure sequence in S67 are respectively effected and the main sequence proceeds to end.

The third embodiment will be summarized below. While the camera has been directed to an object to be photographed without operating the release switch, light-metering in S56 and range-finding in S57 are effected repeatedly. If the brightness of the object is greater than the predetermined value and the drive direction of the lens is altered in the range-finding operation, then the backlash of the lens is canceled. After that, on operation of the release switch, the judgment in S64 is Yes, and the lens is driven to an in-focus position without canceling the backlash, because backlash of the lens has been already canceled before sensing the release switch.

If the brightness of the object is lower than the predetermined value and the drive direction of the lens is altered in the range-finding operation, then the backlash canceling of the lens is not effected. After that, on operating the release switch, since the backlash has not been canceled, the main sequence proceeds to backlash canceling in S68, range-finding in S69, and lens drive in S65.

According to the third embodiment, the backlash of the lens is canceled before the release operation while the object brightness is greater than the predetermined value, so that the release time lag is shortened without reducing focus accuracy. Furthermore, backlash canceling is prohibited when object brightness is lower than the predetermined value, so that improper lens drive can be avoided due to low reliability in range-finding.

The object brightness may also be available from the output signal of the range-finding operation in S57, or light-metering in S56 before or after the range-finding in S57.

Now, a fourth embodiment of the present invention will be described with reference to FIGS. 9 and 13. In FIG. 9, power is applied in step S1, initializing operation is effected in S2, and a main sequence corresponding to the fourth embodiment is executed in S3.

FIG. 13 illustrates a flowchart of the fourth embodiment of the present invention. In FIG. 13, display and other process are effected in S74, and state of operation switches are sensed in S76 by the result of key scan operation in S75. If no keys are operated, then range-finding is effected in S77, and a drive amount of the lens is judged as a predetermined drive condition as to whether it is greater than a predetermined value in S78. If the driving amount of the lens is lower than the predetermined value, then the main sequence proceeds to end because it seems to be in-focus in a short period of time. Furthermore, varying the object distance may alter the drive direction of the lens.

On the other hand, in S78, if the driving amount of the lens is greater than the predetermined value, then the drive direction of the lens is judged as to whether it has been altered in S79. If the drive direction of the lens is the same as before, the main sequence proceeds to end because the backlash of the lens has been canceled. Otherwise, backlash canceling of the lens is effected in S80, drive direction of the lens is memorized in S81, and the main sequence proceeds to end in S3, In S76, if any operation switch is judged to be operated, the operated switch is checked as to whether it is the release switch in S82. If it is other than the release switch, then the flow proceeds to its function in S83; otherwise, the lens is checked as to whether the backlash has been canceled in S84. If the backlash of the lens has been canceled, a range finding is performed in S89, the lens is driven to an in-focus position in S85, and the drive direction of the lens is memorized in S86. After that, the sequence including light-metering, mirror drive, diaphragm drive, shutter drive, and film advance is effected in S87, and the main sequence proceeds to end.

In S84, if the backlash of the lens has not been canceled, canceling of the backlash in S88, re-range-finding in S89, lens drive in S85, memorize drive direction of the lens in S86, and the exposure sequence in S87 are respectively effected and the main sequence proceeds to end in S3.

The fourth embodiment will be summarized below. While the camera has been directed to an object to be photographed without operating the release switch, range-finding in S77 is effected repeatedly. If the driving amount of the lens is greater than the predetermined value and the drive direction of the lens is altered in the range-finding operation, then the backlash of the lens is canceled in S80. After that, on operation the release switch, the judgment in S84 is Yes, and the lens is driven to an in-focus position without canceling the backlash, because the backlash of the lens has been already canceled before sensing the release switch.

If the driving amount of the lens is lower than the predetermined value and the drive direction of the lens is altered in the range-finding operation, then the backlash canceling of the lens is not effected. After that, on operating the release switch, since the backlash has not been canceled, the main sequence proceeds to backlash canceling in S88, range-finding in S89, and lens drive in S85.

According to the fourth embodiment, the backlash of the lens is canceled before the release operation while the driving amount of the lens is greater than the predetermined value, so that the release time lag is shortened without reducing focus accuracy. Furthermore, the backlash canceling is prohibited when the driving amount of the lens is lower than the predetermined value, so that battery consumption is reduced because the backlash of the lens is not canceled so frequently.

It is appreciated that those familiar with the art may make modifications in the arrangements as shown for explanatory purposes rather than as limitation without departing from the true spirit of the invention. Therefore, all such modifications and/or equivalents are deemed to fall within the scope of the invention as defined in the appended claims.

What is claimed is:

1. An autofocus camera, comprising:
   (a) at least one operation switch including a release switch;
   (b) range-finding means for detecting a focusing condition of a lens to an object, and for providing a driving direction and a drive amount that the lens is to be adjusted to be in-focus for the object;
   (c) drive means for driving the lens;
   (d) memory means for storing the latest driving direction of the lens; and
   (e) control means for controlling the drive means in response to an output of the range-finding means, an output of the memory means, and a predetermined judging criterion, wherein the control means performs a canceling backlash operation before a first release operation by the release switch is performed if the driving direction is altered and if the predetermined judging criterion is achieved.

2. The camera according to claim 1, wherein said control means repeats the canceling backlash operation of the lens before the first release operation is performed.

3. The camera according to claim 1, wherein said predetermined judging criterion corresponds to a predetermined time period.

4. The camera according to claim 1, wherein said predetermined judging criterion is a function of whether a brightness of the object is less than a predetermined value.

5. The camera according to claim 1, wherein said predetermined judging criterion is a function of whether the drive amount of the lens exceeds a predetermined value.

6. The camera according to claim 1, comprising-at least one operation switch other than the release switch, wherein the control means performs the canceling backlash operation in one of the case where no operation switch is operated and the case where any of the at least one operation switch other than the release switch is operated whereas the release switch is not operated.

7. An autofocus camera, comprising:
   (a) at least one operation switch including a release switch;
   (b) range-finding means for detecting a distance to an object, and for providing a driving direction and a driving amount of a lens in order to focus the lens on the object;
   (c) drive means for driving the lens;
   (d) memory means for storing the driving direction of the lens by said drive means; and
   (e) control means for controlling the drive means in response to an output of said range-finding means, and an output of said memory means, wherein the control means performs a canceling backlash operation before a first release operation by the release switch is performed if the driving direction is altered and if a predetermined judging criterion is achieved.

8. The camera according to claim 7, wherein said range-finding means is able to output only the driving direction of the lens or the driving direction and driving amount of the lens.

9. The camera according to claim 7, wherein said range-finding means outputs a brightness of the object, and said control means controls said drive means in response to the brightness of the object.

10. The camera according to claim 7, wherein said predetermined judging criterion corresponds to a predetermined time period.

11. The camera according to claim 7, wherein said predetermined judging criterion is a function of whether a brightness of said object is less then a predetermined amount.

12. The camera according to claim 7, wherein said predetermined judging criterion is a function of whether the drive amount of the lens exceeds a predetermined threshold.

13. The camera according to claim 7, comprising at least one operation switch other than the release switch, wherein the control means performs the canceling backlash operation in one of the case where no operation switch is operated and the case where any of the at least one operation switch other than the release switch is operated whereas the release switch is not operated.

14. An autofocus camera, comprising:
(a) at least one operation switch including a release switch;
(b) range-finding means for receiving a light flux passed through a photo-taking lens, and for providing a defocus amount and a direction between an object image and a film surface;
(c) memory means for storing a latest information concerning a backlash of the lens for driving the lens to an in-focus position in response to an output of the range-finding means; and
(d) drive means for driving the lens in response to the output of the range-finding means and an output of the memory means, wherein said drive means cancels the backlash of the lens before a first release operation by the release switch is performed if the backlash information is altered and if a predetermined judging criterion is achieved.

15. The camera according to claim 14, wherein said range-finding means operates repeatedly before the first release operation is performed.

16. The camera according to claim 14, wherein said backlash information corresponds to the latest driving direction of the lens.

17. The camera according to claim 14, further including timer means for counting a predetermined lapse of time, wherein the predetermined judging criterion is the predetermined lapse of time, and wherein the backlash of said lens is canceled when said backlash information is altered and said predetermined time has lapsed.

18. The camera according to claim 14, further including judging means for comparing a brightness of said object with a predetermined value, wherein the predetermined judging criterion is the predetermined value, and wherein said backlash of said lens is canceled when said backlash information is altered and the brightness of said object is greater than the predetermined value.

19. The camera according to claim 14, further including judging means for comparing the defocus amount provided by said range-finding means with a predetermined value, wherein the predetermined judging criterion is the predetermined value, and wherein said backlash of said lens is canceled when said backlash information is altered and the defocus amount is greater than the predetermined value.

20. The camera according to claim 14, comprising at least one operation switch other than the release switch, wherein the drive means cancels the backlash of the lens in one of the case where no operation switch is operated and the case where any of the at least one operation switch other than the release switch is operated whereas the release switch is not operated.

21. An autofocus camera, comprising:
(a) at least one operation switch including a release switch;
(b) a range-finder for receiving a light flux of an object passed through a photo-taking lens, and for providing a defocus amount and a direction between an object image and a film surface;
(c) a memory device for storing the latest information concerning a backlash of the lens for driving the lens to an in-focus position in response to an output of the range-finder; and
(d) a lens driver for driving the lens in response to an output of the range-finder and an output of the memory device, wherein the lens driver cancels the backlash of the lens before a first release operation by the release switch is performed if the backlash information is altered and if a predetermined judging criterion is achieved.

22. The camera according to claim 21, wherein said predetermined judging criterion corresponds to a predetermined time period.

23. The camera according to claim 21, wherein said predetermined judging criterion is a function of whether a brightness of said object is less then a predetermined amount.

24. The camera according to claim 21, wherein said predetermined judging criterion is a function of whether the drive amount of the lens exceeds a predetermined threshold.

25. The camera according to claim 21, comprising at least one operation switch other than the release switch, wherein the lens driver cancels the backlash of the lens in one of the case where no operation switch is operated and the case where any of the at least one operation switch other than the release switch is operated whereas the release switch is not operated.

26. An autofocus camera, comprising:
(a) at least one operation switch including a release switch;
(b) a photo-taking lens;
(c) a range-finding circuit for measuring a distance to an object from the camera;
(d) a lens drive circuit for driving the lens; and
(e) a control circuit for determining a driving direction of the lens on the basis of an output of the range-finding circuit, wherein before a first release operation by the release switch is performed, if the driving direction is altered and if a predetermined judging criterion is achieved, the control circuit cancels the backlash of the lens separately from lens drive for driving the lens to an in-focus position.

27. The camera according to claim 26, further including a brightness judging circuit for comparing an object brightness with a predetermined value, wherein the predetermined judging criterion is the predetermined value, and wherein said control circuit cancels the backlash of the lens when the object brightness exceeds the predetermined value.

28. (The apparatus according to claim 26, further including a calculation circuit for calculating a driving amount of the lens, wherein said control circuit cancels the backlash of the lens when the driving amount of the lens is greater than a predetermined value, and wherein the predetermined judging criterion is the predetermined value.

29. The camera according to claim 26, further including a timer circuit for counting a predetermined lapse of time, wherein the predetermined judging criterion is the predetermined lapse of time, and wherein the backlash of said lens is canceled when said backlash information is altered and said predetermined time is lapsed.

30. The camera according to claim 26, comprising at least one operation switch other than the release switch, wherein the control circuit cancels the backlash of the lens in one of the case where no operation switch is operated and the case where any of the at least one operation switch other than the release switch is operated whereas the release switch is not operated.

31. An autofocus camera, comprising:
(a) at least one operation switch including a release switch;

(b) range-finding means for detecting a distance to an object, and for providing a driving direction and a driving amount of the lens in order to focus the lens on the object;

(c) driving means for driving the lens;

(d) memory means for storing the driving direction of the lens by said drive means and a latest information concerning a backlash of the lens; and (e) control means for controlling the drive means in response to an output of said range-finding means and an output of said memory means, wherein the control means performs a canceling backlash operation before a first release operation by the release switch is performed if the driving direction is altered and if a predetermined judging criterion is achieved.

32. The camera according to claim 31, further including a timer means for counting a predetermined lapse of time, wherein the predetermined judging criterion is the predetermined lapse of time, and wherein the backlash of said lens is canceled when said backlash information is altered and said predetermined time is lapsed.

33. The camera according to claim 31, further including judging means for comparing a brightness of said object with a predetermined value, wherein the predetermined judging criterion is the predetermined value, and wherein said backlash of said lens is canceled when said backlash information is altered and the brightness of said object is greater than the predetermined value.

34. The camera according to claim 31, further including calculation means for calculating the driving amount of the lens for making the lens to an in-focus position on the basis of the output of the range-finding means and current lens position, wherein said control means cancels the backlash of the lens when the driving amount of the lens is greater than a predetermined value, and wherein the predetermined judging criterion is the predetermined value.

35. The camera according to claim 31, comprising at least one operation switch other than the release switch, wherein the control means performs the canceling backlash operation in one of the case where no operation switch is operated and the case where any of the at least one operation switch other than the release switch is operated whereas the release switch is not operated.

36. An autofocus camera, comprising:

(a) at least one operation switch including a release switch;

(b) a lens;

(c) range-finding device for measuring a distance to an object from the camera;

(d) drive circuit for driving the lens;

(e) memory means for storing a latest driving position of the lens and a latest information concerning a backlash of the lens; and (f) control means for determining a driving direction of the lens on the basis of an output of the memory means and a current position of the lens, and for canceling the backlash of the lens before a first release operation by the release switch is performed if the driving direction is altered and if a predetermined judging criterion is achieved.

37. The apparatus according to claim 36, further including a timer circuit for counting a predetermined lapse of time, wherein the predetermined judging criterion is the predetermined lapse of time, and wherein the backlash of said lens is canceled when said backlash information is altered and said predetermined time is lapsed.

38. The apparatus according to claim 36, further including judging means for comparing a brightness of said object with a predetermined value, wherein the predetermined judging criterion is the predetermined value, and wherein said backlash of said lens is canceled when said backlash information is altered and the brightness of said object is greater than the predetermined value.

39. The apparatus according to claim 36, wherein said control means cancels the backlash of the lens when a drive amount of the lens exceeds a predetermined value, and wherein the predetermined judging criterion is the predetermined value.

40. The camera according to claim 36, comprising at least one operation switch other than the release switch, wherein the control means cancels the backlash of the lens in one of the case where no operation switch is operated and the case where any of the at least one operation switch other than the release switch is operated whereas the release switch is not operated.

* * * * *